G. REED.
TRAFFIC SIGNAL.
APPLICATION FILED FEB. 15, 1921.

1,388,761.

Patented Aug. 23, 1921.

2 SHEETS—SHEET 1.

Genevieve Reed,
INVENTOR

BY Victor J. Evans
ATTORNEY

WITNESS:

G. REED.
TRAFFIC SIGNAL.
APPLICATION FILED FEB. 15, 1921.
1,388,761.
Patented Aug. 23, 1921.
2 SHEETS—SHEET 2.
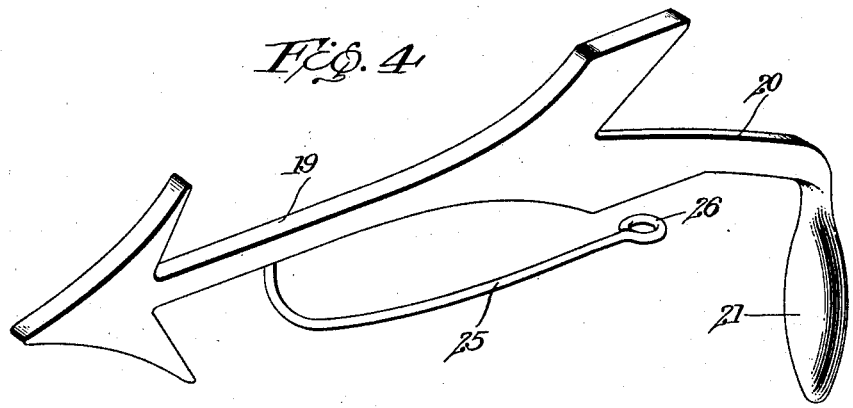
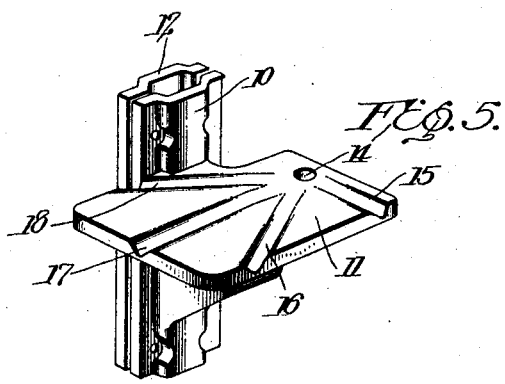
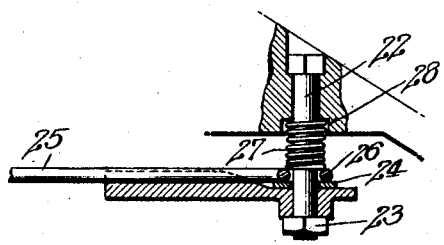
Genevieve Reed,
INVENTOR
BY Victor J. Evans
ATTORNEY
WITNESS:

UNITED STATES PATENT OFFICE.

GENEVIEVE REED, OF NAUGATUCK, CONNECTICUT.

TRAFFIC-SIGNAL.

1,388,761.     Specification of Letters Patent.     Patented Aug. 23, 1921.

Application filed February 15, 1921. Serial No. 445,175.

*To all whom it may concern:*

Be it known that I, GENEVIEVE REED, a citizen of the United States, residing at Naugatuck, in the county of New Haven and State of Connecticut, have invented new and useful Improvements in Traffic-Signals, of which the following is a specification.

This invention relates to signaling devices for motor vehicles and has for its object the provision of a manually operable signaling device including an arrow shaped blade or pointer adapted to be moved by the driver into one of several different positions to indicate to other traffic, such as drivers of other vehicles, pedestrians, and also the traffic officers, any contemplated change in direction of travel so as to avoid accident and congestion and so as to relieve the driver of the necessity of extending an arm to effect the proper signal.

An important object is the provision of a device of this character which will greatly facilitate passage through traffic and also greatly minimize danger of accidents as the driver has the use of both hands when turning.

An additional object is the provision of a device of this character which is of a peculiar formation and provided with novel means whereby it may be frictionally held in its selected positions so that accidental swinging will be prevented in case of jarring or jolting.

A further object is the provision of a device of this character which will not only be simple and inexpensive in construction and installation but attractive in appearance and also efficient and durable in use.

With the above and other objects and advantages in view, the invention consists in the details of construction to be hereinafter more fully described and claimed and illustrated in the accompanying drawings in which—

Figure 1:
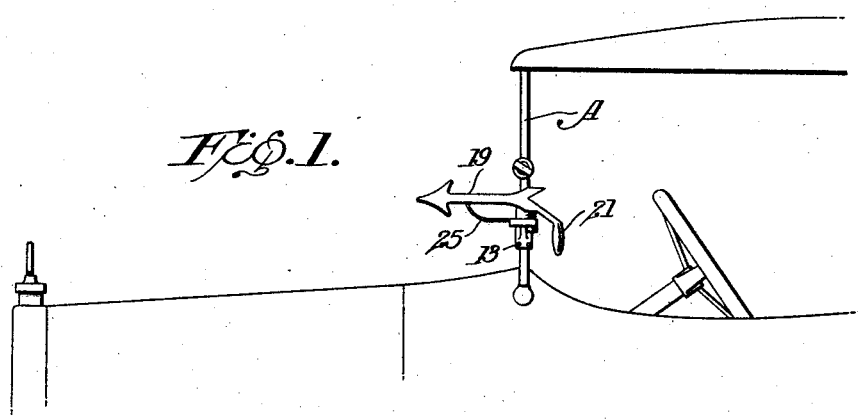
Figure 2:
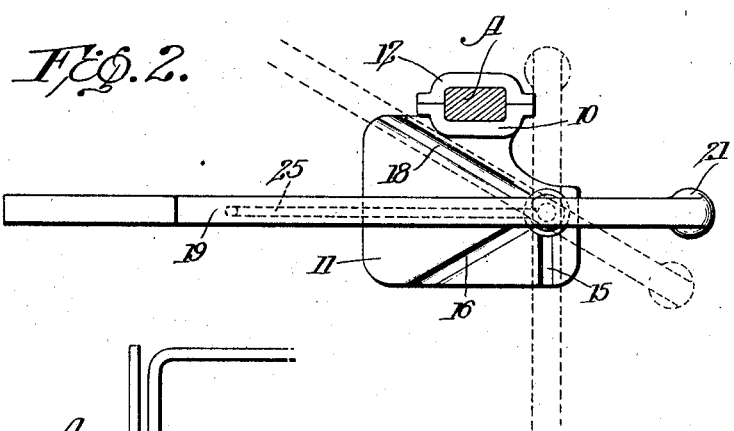
Figure 3:
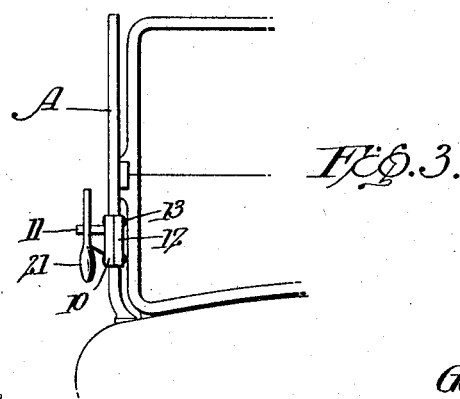

Figure 1 is a side elevation of my device in position upon the wind shield of an automobile showing the device in straight ahead indicating position, Fig. 2 is a plan view thereof, Fig. 3 is an elevation of the wind shield taken from the driver's seat and showing the device in the "stop" indicating position, Fig. 4 is a plan view thereof with the other indicating positions indicated by dotted lines, Fig. 5 is a perspective view of the indicating arrow detached, Fig. 6 is a perspective view of the supporting plate and stop element detached.

Referring more particularly to the drawings, the letter A designates the wind shield frame of an automobile upon which my device is designed to be mounted. In carrying out my invention I provide a supporting structure which is formed as an elongated plate 10 formed as a casting and which is arcuate for conforming engagement upon one side of the wind shield frame. Formed integrally upon this plate 10 is a horizontally disposed platform or bearing plate member 11 which is formed integrally with the plate portion 10, as for instance by casting. Coöperating with the member 10 is a similarly shaped clamping plate 12 likewise engaging the wind shield frame and the members 10 and 12 are held in clamped relation as by means of suitable bolts 13. It is of course quite conceivable that some other specific mounting might be provided but that above described will be found satisfactory and easy to install. Adjacent one end the platform portion 11 is formed with a hole 14 from which radiate grooves 15, 16, 17 and 18, the purpose of which will be explained hereinafter. The device thus far described may be mounted at any desired height upon the wind shield frame and it will be apparent that it may be constructed for use upon either the left or right side of the frame, depending upon whether the automobile is provided with a right or left hand drive. In the drawings the device is shown as being adapted for use on a vehicle having a left hand drive.

The indicating member proper comprises an arrow shaped body 19 which is preferably gilded or painted in some other brilliant or noticeable color. The lower portion of the tail end of this arrow is formed with a downwardly inclined extension 20 terminating in a depending handle 21. Suitably secured to and depending from the underside of the tail portion of the arrow is a bolt 22 journaled through the hole 14 and carrying a nut 23. I further provide a washer 24 on this bolt bearing upon the upper surface of the platform member 11. Secured to the underside of the arrow at a point spaced back from the head thereof, is one end of a curved resilient rod 25 which in actual practice is formed of wire of suitable gage and the rear end of this rod is formed with a loop or eye 26 engaged upon the bolt 22. Surrounding the bolt and abutting against the top of the loop 26 is a coil spring 27 which is seated within a suitable recess 28 in the arrow and which is for the purpose of urging the rod member 25 downwardly and into resilient engagement with the platform member so that this rod member 25 will snap into the grooves 15, 16, 17 or 18, depending upon into which position the arrow is moved. In the use of the device it will be seen that under ordinary conditions, that is when the driver of the automobile is driving straight ahead and intends to make no turn whatever, the arrow 19 is disposed in straight ahead position with the rod member 25 engaged within the groove 17. If the driver intends to turn to the right he grasps the handle 21 and swings the arrow toward the right until the rod member 25 engages within the groove 18. If he intends to turn to the left he swings the arrow to the left with the rod 25 engaging within the groove 16. If he intends to stop he swings the arrow entirely to the left so that the rod 25 will engage within the groove 15. The action of the spring 17 together with the resilience of the rod 25 will operate to hold the arrow member in the selected position with sufficient firmness to prevent it from being jolted out of place in case the vehicle is traveling over rough roads but at the same time the engagement is light enough that it will require no great effort to change the position of the arrow.

From the foregoing description and a study of the drawings it will be apparent that I have thus provided a very simple and inexpensive signaling device which will operate with great efficiency and with very little effort and which will be not only a great convenience but also a safeguard.

While I have shown and described the preferred embodiment of my invention it is of course to be understood that I reserve the right to make such changes in the form, construction, and arrangement of parts as will not depart from the spirit of the invention or the scope of the subjoined claims. For instance, my device may be used in connection with the vehicles of any description, that is either open or closed motor vehicles, wagons, buggies, motor cycles or in fact any other type of vehicle. It is also to be noted that the device may be used upon either the right or the left side and that the handle member can be made of any desired length so as to reach through a slot in the side of a closed car. It is likewise to be understood that I feel privileged to employ any suitable form of clamp for securing the device in proper position upon any vehicle.

Having thus described my invention, I claim:

1. A device of the character described comprising a bracket member detachably engaged upon one side of a wind shield frame and including a horizontal platform portion provided with a hole and with a plurality of radial grooves, a pointer formed as a body of arrow shape, a bolt depending from said body and revolubly engaged through said hole, a flexible rod member secured at one end to the underside of the pointer body and having its major portion spaced below the lower edge thereof with its rear extremity revolubly engaged upon said bolt, and a coil spring surrounding the bolt and engaging against said rear extremity of the flexible member and against the underside of the pointer body, whereby to hold the flexible member resiliently in engagement within a selected groove.

2. A device of the character described comprising a bracket member adapted to be secured upon one side of a wind shield frame and including a platform portion provided with a hole and formed with a plurality of grooves radiating from said hole, a pointer formed as a body of arrow shape carrying a bolt revolubly engaged through said hole, and a flexible rod member secured at one end to the underside of the pointer body and having its major portion spaced below the lower edge thereof, said flexible member being resiliently engageable within a selected groove whereby to hold the pointer at the desired indicating angle.

In testimony whereof I affix my signature.

Mrs. GENEVIEVE REED.